United States Patent
Herbon (10) Patent No.: US 12,501,162 B2
(45) Date of Patent: Dec. 16, 2025

(54) METHOD FOR OPERATING AT LEAST ONE IMAGE SENSOR

(71) Applicant: Robert Bosch GmbH, Stuttgart (DE)

(72) Inventor: Christopher Herbon, Weil Im Schoenbuch (DE)

(73) Assignee: ROBERT BOSCH GMBH, Stuttgart (DE)

( * ) Notice: Subject to any disclaimer, the term of this patent is extended or adjusted under 35 U.S.C. 154(b) by 86 days.

(21) Appl. No.: 18/154,342

(22) Filed: Jan. 13, 2023

(65) Prior Publication Data
US 2023/0232109 A1 Jul. 20, 2023

(30) Foreign Application Priority Data

Jan. 18, 2022 (DE) .................... 10 2022 200 512.0
Sep. 8, 2022 (DE) .................... 10 2022 209 356.9

(51) Int. Cl.
| | |
|---|---|
| *H04N 23/695* | (2023.01) |
| *G06T 7/20* | (2017.01) |
| *G06T 7/70* | (2017.01) |
| *H04N 1/32* | (2006.01) |
| *H04N 7/18* | (2006.01) |
| *H04N 23/60* | (2023.01) |
| *H04N 23/68* | (2023.01) |
| *H04N 23/90* | (2023.01) |
| *H04N 101/00* | (2006.01) |

(52) U.S. Cl.
CPC ............ *H04N 23/695* (2023.01); *G06T 7/20* (2013.01); *G06T 7/70* (2017.01); *H04N 1/32128* (2013.01); *H04N 7/188* (2013.01); *H04N 23/64* (2023.01); *H04N 23/689* (2023.01); *H04N 23/90* (2023.01); *G06T 2207/30244* (2013.01); *G06T 2207/30252* (2013.01); *H04N 2101/00* (2013.01); *H04N 2201/3252* (2013.01); *H04N 2201/3253* (2013.01)

(58) Field of Classification Search
None
See application file for complete search history.

(56) References Cited

U.S. PATENT DOCUMENTS

2022/0342047 A1* 10/2022 Moscovici ............ G01S 17/931

FOREIGN PATENT DOCUMENTS

| | | | |
|---|---|---|---|
| CN | 101777261 A | * 7/2010 | |
| DE | 102013220477 A1 | 4/2015 | |
| DE | 102015006637 A1 | 2/2016 | |
| WO | WO-2007045714 A1 | * 4/2007 | ............ H04N 3/155 |

OTHER PUBLICATIONS

English translation for CN-101777261-A, 2010, Chai (Year: 2010).*

* cited by examiner

*Primary Examiner* — James M Hannett
(74) *Attorney, Agent, or Firm* — NORTON ROSE FULBRIGHT US LLP (57) ABSTRACT

A method of operating at least one image sensor that records an image content with a recording direction. The method includes the following steps: a) determining at least one piece of information about an expected main direction of movement of an expected movement in at least a portion of an image content to be recorded relative to the image sensor, b) setting the recording direction taking into account the expected main direction of movement, c) recording at least a portion of the image content with the recording direction.

18 Claims, 6 Drawing Sheets

METHOD FOR OPERATING AT LEAST ONE IMAGE SENSOR

FIELD

The present invention relates to a method for operating at least one image sensor, in particular with rolling shutter. Moreover, a computer program for performing the method, a machine-readable storage medium having the computer program, and an environmental sensor system for a vehicle are provided by the present invention.

BACKGROUND INFORMATION

Despite the availability of sensors with global shutters, i.e., sensors in which all pixels are exposed simultaneously, sensors with rolling shutters are still used for many applications in the automotive or robotic contexts, in particular CMOS sensors.

Rolling shutter describes the property of a sensor that not all pixels are exposed at the same time. Rather, the exposure takes place row-wise or column-wise. In other words, in a rolling shutter property, an image content is recorded row-wise or column-wise, and thus in a recording direction.

The recording direction describes a direction extending in the plane of the image. Recording with a recording direction (row-wise or column-wise) means that first rows or columns are recorded that are situated at the beginning of a (virtual) direction vector aligned along the recording direction and subsequently rows or columns are recorded that are situated further rearward along the direction vector.

Reasons for the use of rolling shutter sensors are on the one hand the less expensive manufacture and on the other hand the existing certification for automotive applications.

One conventional feature of rolling shutter sensors is that the exposure of the individual image rows occurs at an offset in time. Thus, during a camera movement, the image content continues to move, while a part of the image has already been exposed. This effect is only visible to humans in exceptional cases, but has a major impact on computer vision algorithms.

Figure 2:
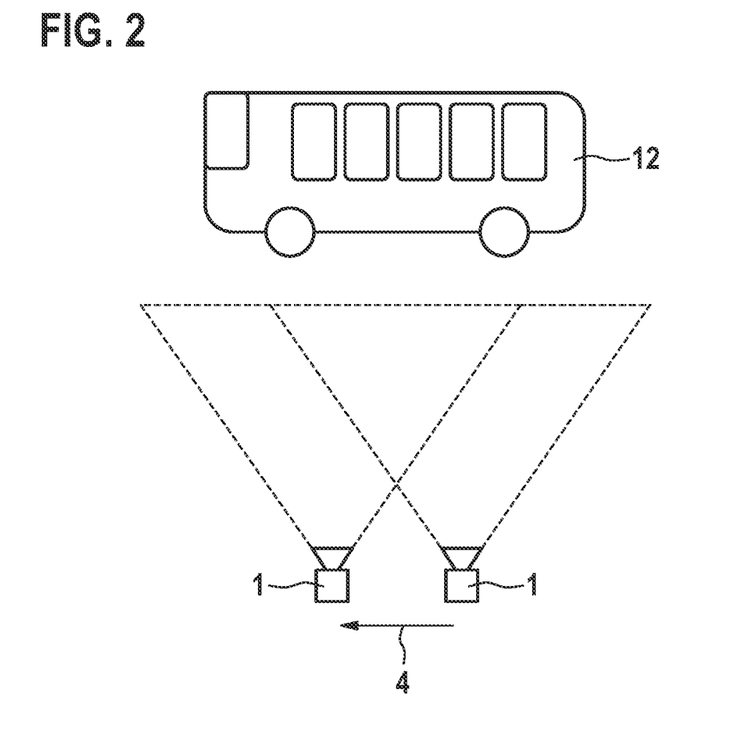
FIG. 2 shows an exemplary application of the described method of the present invention.

A typical effect of the rolling shutter is a shearing of the scene or the imaged object, as seen by way of example in FIG. 2. While the global shutter image is only affected by the general motion blur, a distinct geometrical distortion can be seen in the rolling shutter image.

For computer vision algorithms, for example classifiers or neural networks, this poses a particular challenge because the imaged objects do not have a uniform geometric shape as a result. This may result in the need for a larger amount of training data or in some cases may result in objects not being detected at all.

SUMMARY

An object of the present invention is to resolve the problems described with reference to the related art at least partially. In particular, geometrical distortions are to be minimized and, in particular, shearing is to be avoided as far as possible.

The objectives may be achieved with a method according to features of the present invention. Advantageous developments and example embodiments of the present invention are disclosed herein. The following description may include other advantageous further developments.

According to the present invention, a method of operating at least one image sensor that records image content in a recording direction is provided. According to an example embodiment of the present invention, the method comprises at least the following steps:

a) determining at least one piece of information about an expected main direction of movement of an expected movement in at least a portion of an image content to be recorded relative to the image sensor, b) setting the recording direction taking into account the expected main direction of movement, c) recording at least a portion of the image content with the recording direction.

To implement the method, steps a), b) and c) may be carried out for example at least once and/or repeatedly or several times in a row in the order indicated. Furthermore, steps a), b) and c), in particular steps a) and b), may be carried out at least partly in parallel or simultaneously. The method may be performed, for example, by means of an environmental sensor system also described herein.

The image sensor is in particular a so-called rolling shutter image sensor. The image sensor may preferably record an image content row-wise or column-wise with a recording direction. In other words, this can also be described in such a way that the recording direction can be defined by the sequence of rows or columns that are recorded or evaluated for recording the image content.

The method particularly serves to reduce distortions in image recording with rolling shutter sensors. Traditional cameras with rolling shutters typically produce geometrical distortions, such as compression or shearing, that can make digital image processing more difficult. The goal of the described method is in particular to control the (unavoidable) rolling shutter effect in such a way that geometrical distortions can be reduced.

In a particularly advantageous embodiment, the method specifies an adaptive rolling shutter for minimizing geometrical distortions.

In step a), at least one piece of information is determined about an expected main direction of movement of an expected movement in at least a portion of an image content to be recorded relative to the image sensor. The main direction of movement may be described for example via one, two or more directional components of the movement of at least one object in the environment of the image sensor. The information may be detected using an object tracker, for example. Alternatively, or cumulatively, a determination of an optical flow may be used to detect the information. Furthermore, information about the installation position or mounting position and/or orientation of the image sensor may contribute to determining the expected main direction of movement. Advantageously, when the image sensor is arranged in or on a vehicle, a detected travel situation may contribute toward determining the expected main direction of movement.

In step b), the recording direction is set, taking into account the expected main direction of movement. Setting the recording direction may include an initial setting of the recording direction. Alternatively, or cumulatively, setting the recording direction may comprise adapting or changing a previously set recording direction. The setting may be performed so as to select a recording direction suitable for reducing one or more geometrical distortions in the image recording.

In step c), at least a portion of the image content is recorded with the recording direction. If applicable, this may also include re-recording a scene previously recorded in a different recording direction. By recording with the thus set recording direction, geometric distortions in the image recording can be particularly advantageously reduced or as much as possible.

According to an advantageous embodiment of the present invention, it is provided that the image sensor is a CMOS sensor. Typically, image sensors convert photons into electrical charge by the photoelectric effect. In the case of CMOS sensors (Complementary Metal-Oxide Semiconductor), the charges are advantageously converted into a voltage already in the pixel, in contrast to CCD sensors (Charge-Coupled Device). This voltage may be amplified, quantized and output as a digital value. Moreover, CMOS sensors with row-wise or column-wise recording are a particularly advantageous embodiment of rolling shutter sensors.

According to a further advantageous embodiment of the present invention, it is provided that at least one piece of information about a position and/or orientation of the image sensor is determined. This piece or these pieces of information can be obtained, for example, via data on the installation situation of the image sensor. In this connection, it is particularly advantageous if the information about the position and/or orientation of the image sensor is considered when determining the at least one piece of information about the main direction of movement.

According to a further advantageous embodiment of the present invention, it is provided that the at least one piece of information about the expected main direction of movement is determined by establishing an optical flow and/or by using object tracking. This piece or these pieces of information may be obtained, for example, from an image processing system, particularly including an object tracker.

According to a further advantageous embodiment of the present invention, it is provided that the recording direction is adapted taking into account the expected main direction of movement or a change thereof, and in particular at least a portion of the image content is recorded with the adapted recording direction. This may contribute to an advantageous adaptivity of the method.

According to another advantageous embodiment of the present invention, it is provided that the recording direction be set or adapted in such a way that it is oriented essentially parallel to the expected main direction of movement.

According to another advantageous embodiment of the present invention, it is provided that the recording direction be set or adapted in such a way that it is oriented essentially in the opposite direction or in the same direction as the expected main direction of movement.

According to a further advantageous embodiment of the present invention, it is provided that the at least one image sensor is arranged in or on a vehicle, in particular an automobile, and wherein the information about the expected main direction of movement is determined as a function of a detected travel situation.

According to a further advantageous embodiment of the present invention, it is provided that the at least one image sensor is part of a front camera of a vehicle and wherein the recording direction is set from bottom to top upon determination of a forward travel, and in particular, upon determination of reverse travel to a recording direction from top to bottom.

According to a further advantageous embodiment of the present invention, it is provided that the at least one image sensor is part of a side camera of a vehicle, and wherein the recording direction is set to be essentially identical to the direction of travel when oncoming traffic can be expected, and wherein the recording direction is set to be essentially opposite to the direction of travel when overtaking vehicles can be expected.

In yet another aspect, a computer program for performing a method presented herein is provided. In other words, this relates in particular to a computer program (product) comprising instructions that, when the program is executed by a computer, cause the computer to perform a method described herein.

According to a further aspect of the present invention, a machine-readable storage medium on which the computer program provided herein is saved or stored is provided. Normally, the machine-readable storage medium is a computer-readable data carrier.

According to another aspect of the present invention, an environmental sensor system for a vehicle is proposed having at least one image sensor, wherein the at least one image sensor and/or the environmental sensor system are configured to perform a method described herein. The environmental sensor system may comprise multiple or a plurality of image sensors. For example, the environmental sensor system may comprise at least one front camera and at least one side camera. Preferably, the environmental sensor system may comprise a plurality of image sensors arranged to form a camera belt around the vehicle. The environmental sensor system may further comprise for example a computer and/or a controller, which is able to execute instructions in order to perform the method. For this purpose, the computer or the controller can, for example, execute the specified computer program. For example, the computer or the controller may access the indicated storage medium in order to execute the computer program.

The details, features and advantageous embodiments discussed in connection with the method may also occur in the computer program and/or storage medium and/or the environmental sensor system presented herein, and vice versa. In this respect, reference is made to the full extent to the statements therein regarding the more detailed characterization of the features.

Example embodiments of the present invention and their technical environment are explained in further detail below with reference to the figures. It should be noted that the present invention is not to be limited by the embodiment examples shown. In particular, unless explicitly shown otherwise, it is also possible to extract partial aspects of the facts explained in the figures and to combine these with other components and/or findings from other figures and/or the present disclosure.

DETAILED DESCRIPTION OF EXAMPLE EMBODIMENTS

Figure 1:
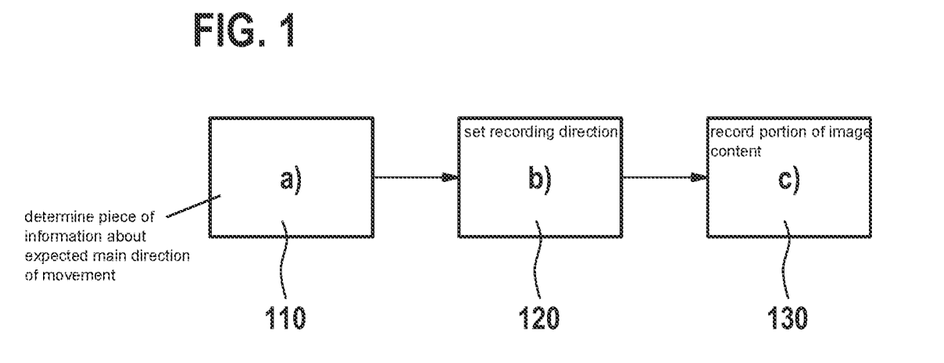
FIG. 1 shows an exemplary flowchart of the method presented herein, according to the present invention.

FIG. 1 schematically shows an exemplary flowchart of the method presented here. The method is for operating at least one (rolling shutter) image sensor 1, which records an image content 2, in particular row-wise or column-wise, with a recording direction 3. The sequence of steps a), b) and c) shown with blocks 110, 120 and 130 is exemplary and may be run through for example at least once in the order shown to perform the method.

In block 110, according to step a), at least one piece of information about an expected main direction of movement 4 of an expected movement is determined in at least a portion of an image content 2 to be recorded relative to the image sensor 1. In block 120, according to step b), the recording direction 3 is set taking into account the expected main direction of movement 4. In block 130, according to step c), at least a portion of the image content 2 is recorded with the recording direction 3.

FIG. 2 schematically illustrates an exemplary application of the described method. In this connection, FIG. 2 shows in exemplary and schematic fashion a laterally-moving camera recording a stationary object 12. The camera provides an example of an image sensor 1 described herein. The relative movement between image sensor 1 and object 12 is indicated with an arrow, which here represents a main direction of movement 4, by way of example, along which a (relative) movement is to be expected in at least a portion of an image content 2 recorded by the image sensor 1.

Figure 3:
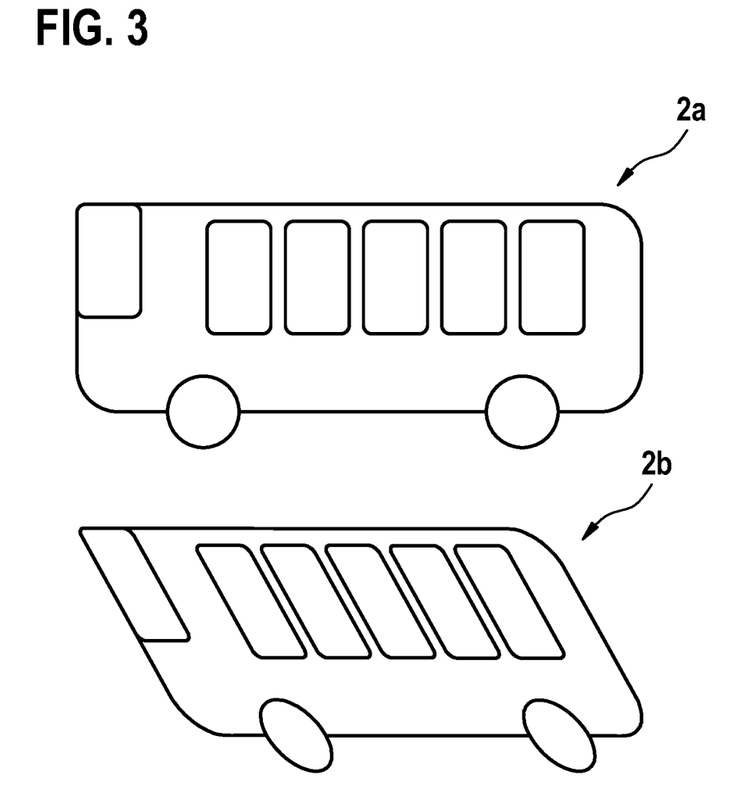
FIG. 3 shows various recordings of the object of FIG. 2.

FIG. 3 schematically illustrates various recordings of the object 12 of FIG. 2. FIG. 3 thus illustrates in exemplary and schematic fashion a recording of an object 12 while the camera or the image sensor 1 is moved laterally (see FIG. 2). The recordings differ in that for the upper recording the image content 2a was recorded with a global shutter, whereas for the lower recording the image content 2b was recorded with a rolling shutter. It is exemplarily illustrated that and, if applicable, how the rolling shutter effect may result in clearly visible shearing.

Figure 4:
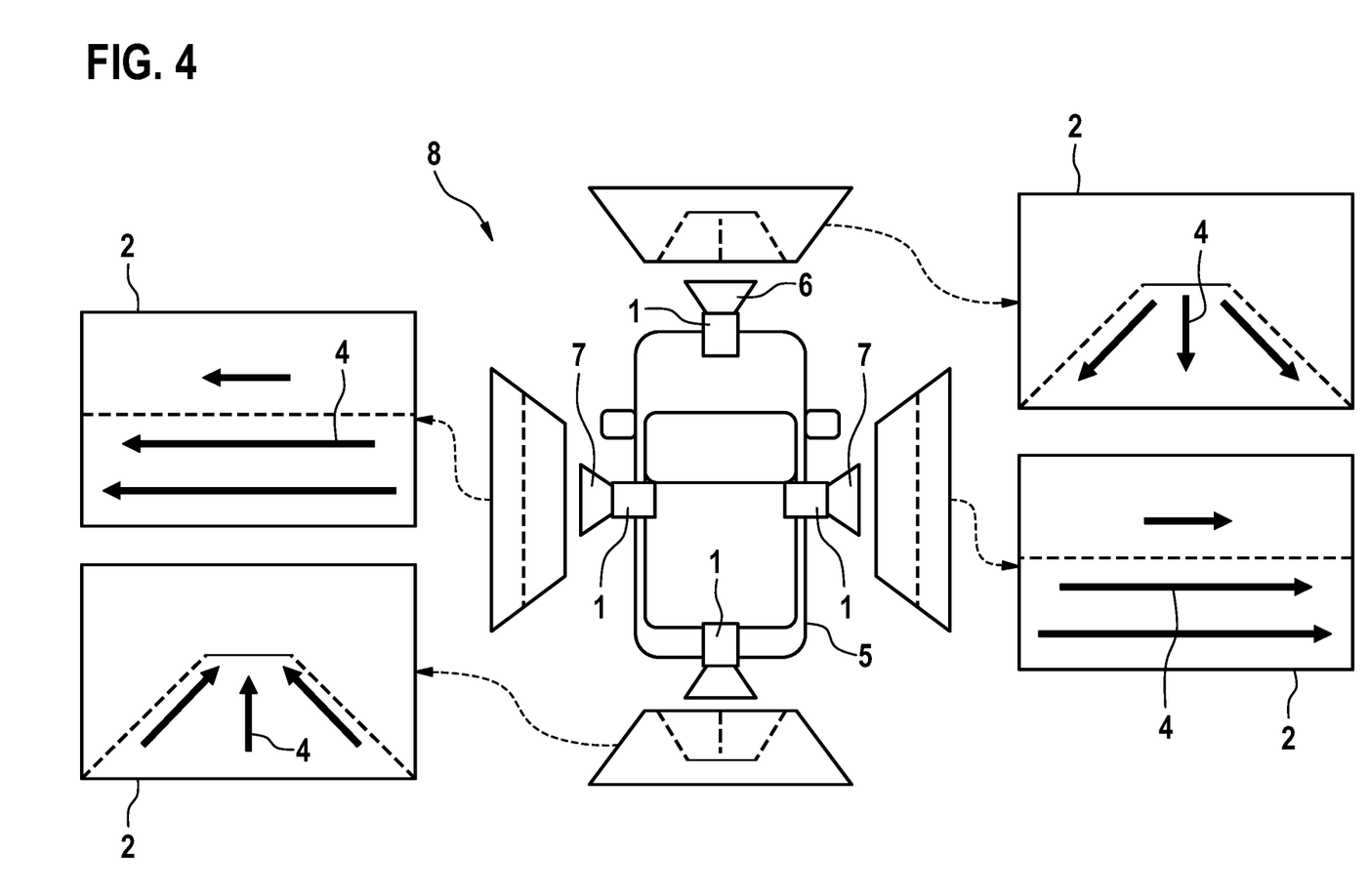
FIG. 4 shows common influences on image sensors of a vehicle.

FIG. 4 schematically illustrates common influences on image sensors 1 of a vehicle 5. In this connection, FIG. 4 illustrates in exemplary and schematic fashion that and, if applicable, how for cameras or image sensors 1 mounted on a vehicle 5, the installation position may play a role for the main direction of movement 4. For each image, the expected movement is shown schematically by arrows in, for example, a forward travel.

FIG. 4 further depicts an example of an environmental sensor system 8 described herein for a vehicle 5 having at least one image sensor 1, wherein the at least one image sensor 1 and/or the environmental sensor system 8 are configured to perform the method described herein.

Figure 5:
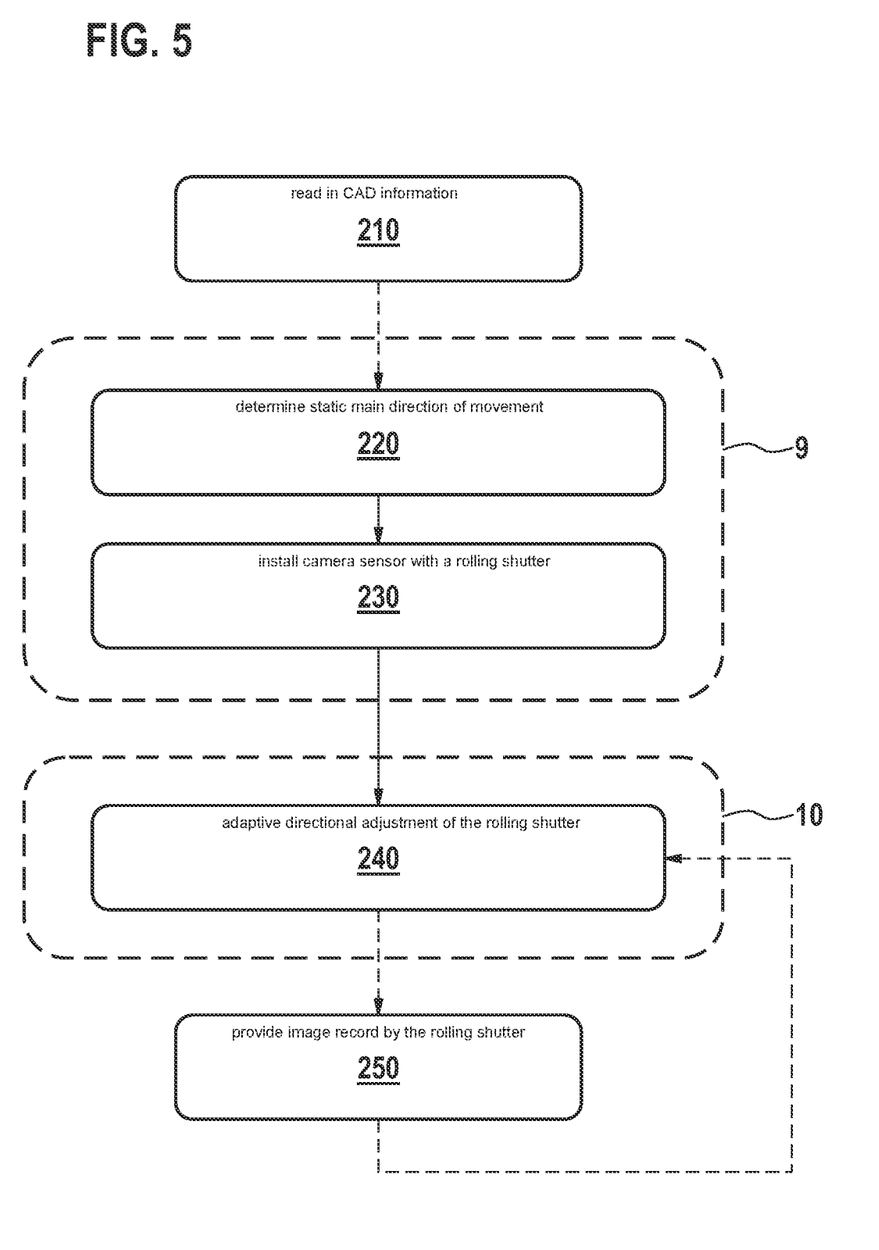
FIG. 5 shows a flowchart of an advantageous embodiment variant of the method according to the present invention.

FIG. 5 schematically shows a flowchart of an advantageous embodiment variant of the method presented. In this connection, FIG. 5 shows in exemplary and schematic fashion a block diagram of an advantageous embodiment variant of the method described herein. In particular, three exemplary parts of the method are shown, which may be used, for example, together with static input data (CAD information) and/or dynamic data from an image processing system. The three parts of the method include, by way of example, the step of determining the static main direction of movement and the step of installing the camera sensor with rolling shutter parallel to the main motion direction, which together form an exemplary static part of the method, and the step of adaptive directional adjustment of the rolling shutter, which forms an exemplary dynamic part of the method.

The embodiment variant is divided by way of example into a static part 9 and a dynamic part 10. For example, in block 210, CAD information may be read in. In block 220, a determination of a static main direction of movement may be made. The CAD information can contribute to this. In exemplary fashion, this illustrates that and, if applicable, how according to step a) a determination can be made of at least one piece of information about an expected main direction of movement 4 of an expected movement in at least a portion of an image content 2 to be recorded relative to the image sensor 1.

In block 230, an installation of a camera sensor with a rolling shutter can occur parallel to the main direction of movement. In exemplary fashion, this may illustrate that and, if applicable, how as per step b) a setting of the recording direction 3 can be carried out taking into account the expected main direction of movement 4. In block 240, an adaptive directional adjustment of the rolling shutter can occur. In block 250, an image recorded by the rolling shutter set in this manner may be provided to an image processing system. This may represent an example for a recording of at least a portion of the image content 2 with the recording direction 3.

The adaptive adjustment of direction, which can also occur, for example after a feedback from the image processing system indicated in FIG. 5, can represent a further example of the fact that and, if applicable, how as per step b) a setting of the recording direction 3 can be carried out taking into account the expected main direction of movement 4. Subsequently, a further recording or rerecording may be performed with the image sensor 1 adapted in this manner.

For example, a rolling shutter or image sensor 1 may be configured in such a way that the geometrical distortion is advantageously reduced. The following goals can be pursued individually or together:
- The distortion should change as little as possible over time.
- The distortion should be as independent as possible of the location in the image or the recorded scene.
- The distortion should cause only simple compressions if possible and in particular no shearing (cf. FIG. 3).
- A compression may be preferable to stretching because smaller object sizes and thus smaller movements may be advantageous for computer vision algorithms, in particular for the optical flow.

In particular, in order to achieve this goal, information about the installation position of the camera or the image sensor 1 and/or the expected movement in the image (main direction of movement 4) can be used particularly preferably. Furthermore, the information about the mounting position can contribute to determining the main direction of movement 4 and thus also represent information about the expected main direction of movement 4.

An advantageous embodiment can be formed with several parts or steps, for example the following:
i. Determination of main direction of movement 4 (for example in step a)
ii. Installation of the camera sensor or image sensor 1 taking into account the expected main direction of movement 4 (for example, in step b)

iii. Dynamically shifting the rolling shutter direction or recording direction 3, depending on the change of the main direction of movement 4 (for example in step b).

A particularly advantageous connection of these individual (partial) steps is shown by way of example in FIG. 5.

A determination of the main direction of movement 4 can be made. FIG. 4 shows by way of example which directions of movement are typically to be expected for a selection of cameras or image sensors 1 on a vehicle 5, such as a passenger car. In particular, a straight forward travel may be assumed, which may approximately occur in the vast majority of travel situations.

To determine the main direction of movement 4, one or more of the following approaches or steps may be used:
- α. Assumption of the typical travel situation (e.g., straight-line travel) and in particular derivation of the expected movement from the installation position of the camera or the image sensor 1 (static approach)
- β. Determination of the optical flow and in particular long-term averaging of the results (dynamic approach)
- γ. Long-term averaging of the object movements, e.g., as a result of an object tracker (dynamic approach)
- δ. Combination of one or more of the above approaches A derivation of the main direction of movement 4 from the camera installation position is advantageously possible if assumptions can be made about the direction of movement of the camera (image sensor 1) or the imaged objects 12. In this way, an expected movement in the image (in particular in the manner of an optical flow) can be determined, in particular with the aid of a simulation. The main direction of movement 4 can then be advantageously derived therefrom.

By way of example, this shows that and, if applicable, how at least one piece of information about a (installation) position and/or orientation of the image sensor 1 can be determined. Furthermore, this provides an example for the fact that and, if applicable, how the information about the (installation) position and/or orientation of the image sensor 1 can be considered in determining the at least one piece of information about the main direction of movement 4.

Figure 6:
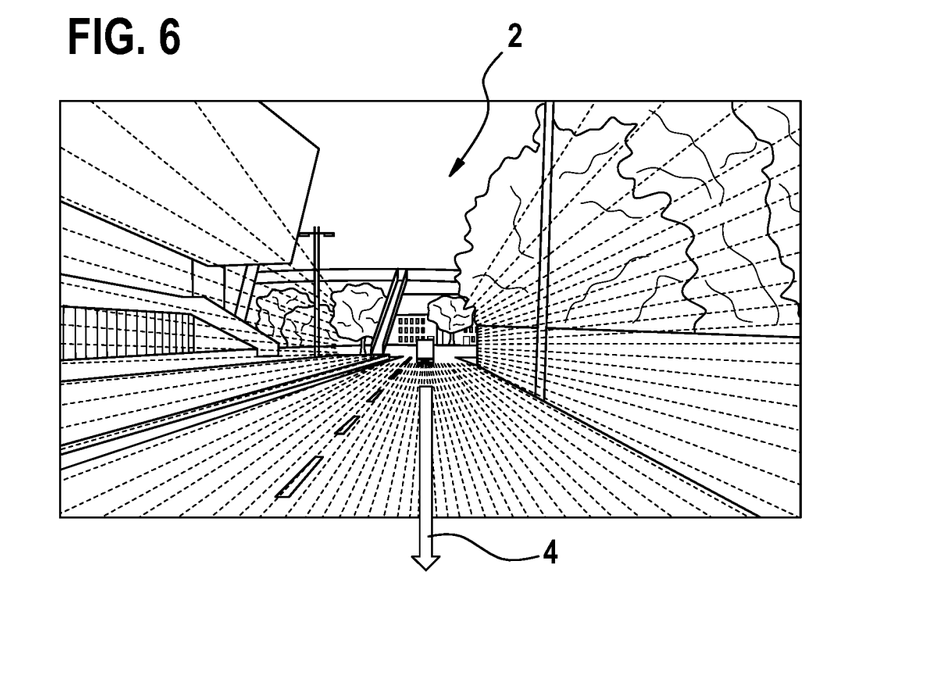
FIG. 6 shows an example of a common influence of a travel motion on the image content.

FIG. 6 schematically shows an example of a common influence of a travel movement on the image content 2. In this connection, FIG. 6 shows by way of example that for forward travel with a vehicle 5, the optical flow is typically shown from the center of the image towards the sides. A choice of the main direction of movement 4 from top to bottom is particularly suited for minimizing the distortion on the road.

The optical flow is particularly advantageous for generic situations in which the distortion is to be entirely minimized for the scene. It usually covers the whole image or at least the relevant portions of the image, and in this way advantageously allows for the main direction of movement 4 to be determined independently of a priori knowledge of the image content 2 (see FIG. 6). Thus, the optical flow may advantageously be used for any type of camera or image sensor 1 in any desired position. It is in particular not limited to vehicles 5, but can also be used for stationary surveillance cameras, for example.

Object movements are particularly useful if the distortion of the objects 12 themselves is to be minimized. Objects 12 may be, for example, vehicles, pedestrians, road signs, but also buildings or other clearly delineated units. In contrast to the optical flow, knowledge about the type and appearance of the expected objects is advantageous, for example for the training of a classifier or a neural network.

Figure 7:
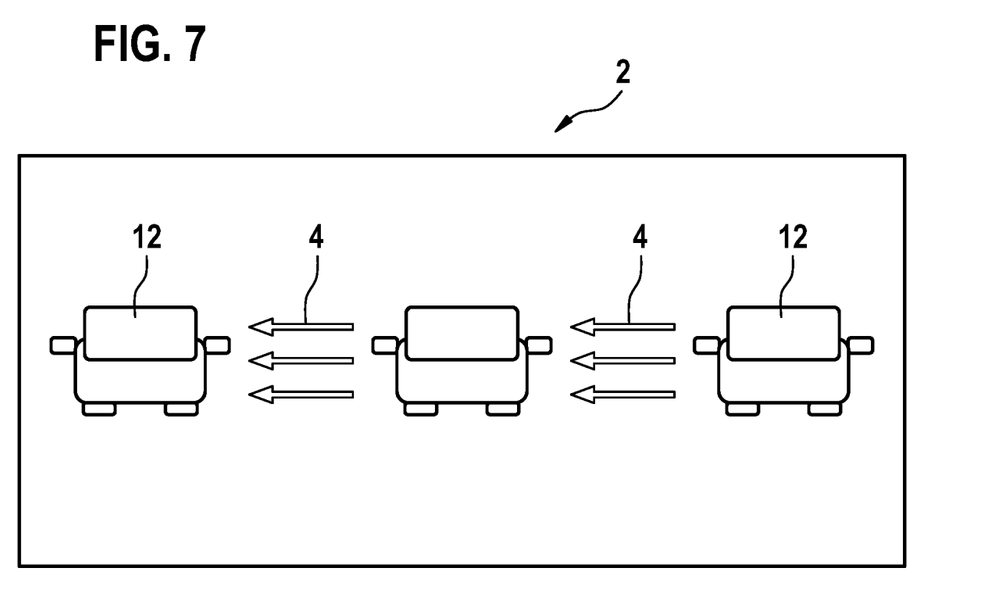
FIG. 7 shows an advantageous option for determining object movements, according to an example embodiment of the present invention.

FIG. 7 schematically illustrates an advantageous possibility for determining object movements. In this connection, FIG. 7 shows, in exemplary and schematic fashion, a simplified representation of an object tracker. The movement of an object 12 in the image is indicated by arrows. The knowledge about the object movement can be advantageously used to determine the main direction of movement 4.

Objects 12 are normally detected on a single image or a rather small number of images. Once detected, objects 12 may then be tracked temporally or spatially (across multiple cameras or image sensors 1) (see FIG. 7). The information about the movement of the objects 12 from this tracking may then be averaged over an extended period of time in order to determine the main direction of movement 4 (of the objects 12).

The examples of FIGS. 6 and 7 illustrate that and, if applicable, how the at least one piece of information about the expected main direction of movement 4 can be determined by ascertaining an optical flow and/or by using object tracking.

An installation of the camera sensor or image sensor 1 can be determined. The installation of the camera sensor can be (unambiguously) derived from the main direction of movement 4. In particular, the goal may be formulated that no shearing should occur if possible, because object 12 may otherwise be more difficult to recognize for computer vision algorithms. This can advantageously be achieved by aligning the rolling shutter in a parallel direction, in particular (exactly) opposite to the main direction of movement 4.

Figure 8:
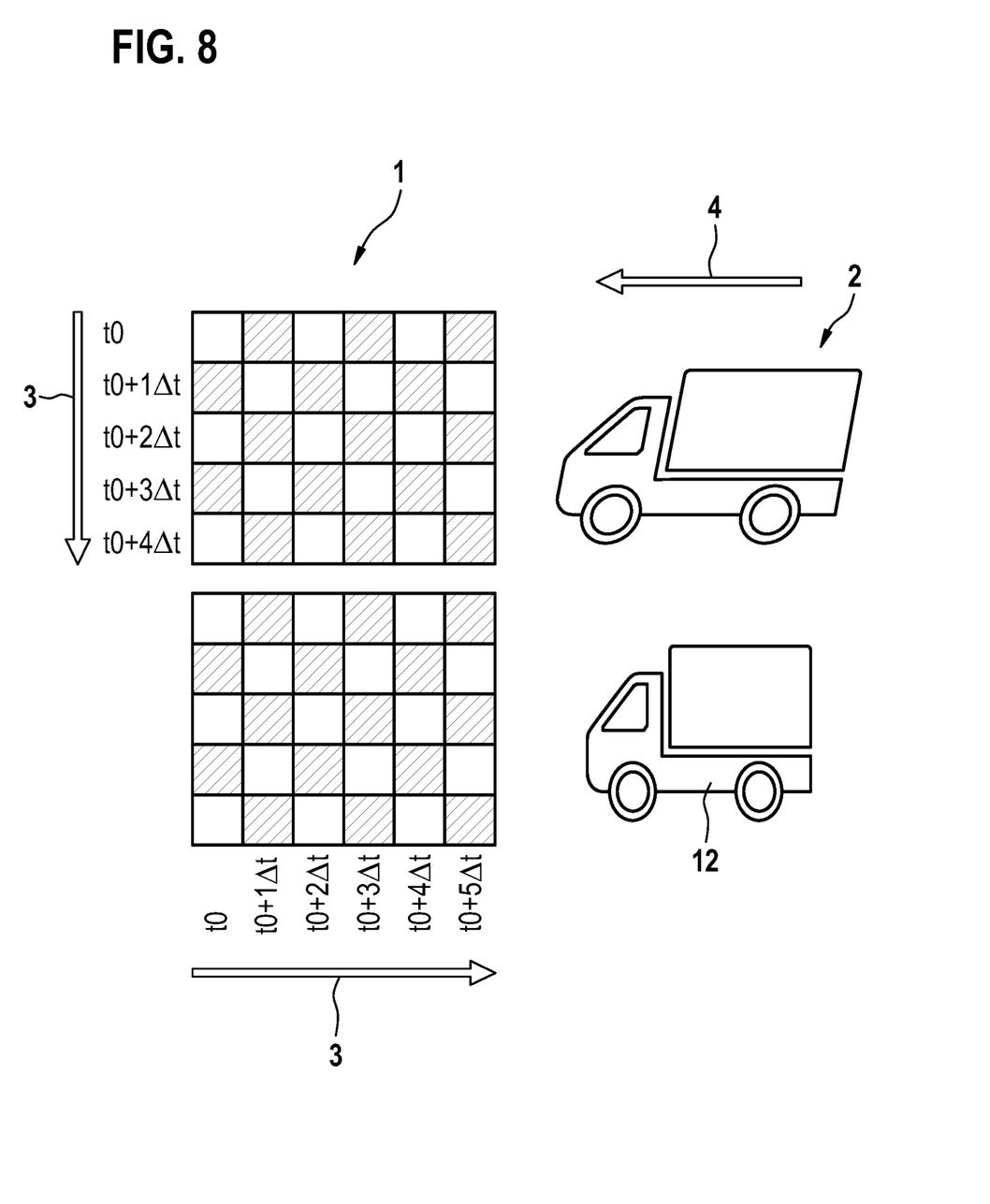
FIG. 8 shows an advantageous application of the described method of the present invention.

FIG. 8 schematically shows an advantageous application of the described method. In this connection, FIG. 8 shows exemplarily and schematically that the direction of the rolling shutter can play a major role in the geometrical distortion affecting the image or objects 12 in the image. For horizontally moving objects 12, a vertical rolling shutter typically results in a severe shearing. However, if the rolling shutter is performed horizontally with the same object movement, only a compression occurs in a particularly advantageous manner.

FIG. 8 illustrates by way of example that for a horizontally moving object 12 (main direction of movement 4 from right to left), the rolling shutter from left to right (image sensor 1 with recording direction 3 from left to right) results in advantageously lower geometrical distortion, since, for example, no shearing occurs here. The opposite direction—from right to left—would also be advantageous. However, object 12 would then be stretched rather than compressed, which may be less advantageous for various computer vision algorithms, particularly for the optical flow.

This represents an example of the fact that and, if applicable, how the recording direction 3 can be set or adapted so as to be essentially parallel to the expected main direction of movement 4. Also advantageously, the recording direction 3 may be set or adapted in such a way that it is oriented essentially in the opposite or in the same direction as the expected main direction of movement 4.

The background for the advantages of a compression is in particular that the optical flow generally has a limitation for the search for movements in the image. The larger the object, the larger normally is its movement or the dominance of the movement of the object in the image. This normally increases the risk that the movement of the object is no longer detected by or can no longer be distinguished from the optical flow or that the movement of the object determines or dominates the optical flow of the image.

For example, a rolling shutter as illustrated by way of example in FIG. 8 may be realized in which a CMOS sensor with row-wise or column-wise recording is used for image sensor 1.

The rolling shutter can be dynamically switched. In particular, the direction of the rolling shutter (recording direction 3) can be adapted, for example, when the main direction of movement 4 changes. This is the case, for example, when a vehicle 5 changes from a forward travel to a reverse travel, or vice versa (cf. the first embodiment variant described below: switching between forward and reverse travel). Another example of an adaptation may be a transition from a curve to a straight-line travel (or vice versa). In that case, it may be advantageous to switch or adjust the rolling shutter from horizontal to vertical.

This provides an example of the fact that and, if applicable, how and adaptation of the recording direction 3 can be carried out taking into account the expected main direction of movement 4 or a change thereof, and in particular how at least a portion of the image content 2 can be recorded with the adapted recording direction 3.

For side cameras, a switch or adaptation as a function the travel situation may also be expedient (cf. the second embodiment described below: overtaking traffic on freeways vs. oncoming traffic on secondary roads).

The examples shown describe that and, if applicable, how the at least one image sensor 1 can be arranged in or on a vehicle 5, in particular an automobile. It is further shown that and, if applicable, how the information about the expected main direction of movement 4 can be determined as a function of a detected travel situation.

According to a first advantageous embodiment variant, switching between forward and reverse travel can occur. A particularly advantageous embodiment variant is the use of the described method for automotive front cameras 6 (cf. FIG. 4). The direction of the rolling shutter typically has a major impact on the length of the motion observed. To determine the optical flow on the road in front of a vehicle 5, the rolling shutter is advantageously performed from bottom to top. If it runs from top to bottom during forward travel, the movement typically becomes longer, which in turn may be disadvantageous for the optical flow. The direction of the rolling shutter can be advantageously dynamically switched as soon as the vehicle 5 travels backwards.

An advantageous realization in this embodiment variant includes a determination of the main direction of movement 4 based on, for example, the vehicle odometry, the installation of the sensor 1, such that the rolling shutter can run opposite to the main direction of movement 4, as well as the dynamic switching based on the vehicle movement (difference: forward or backward).

This provides an example of the at least one image sensor 1 being part of a front camera 6 of a vehicle 5, and that the recording direction 3 can be set from bottom to top when a forward travel is determined, and in particular, when a reverse travel is determined, can be adapted to a recording direction 3 from top to bottom.

In general, it may be advantageous if a vehicle odometry and/or locating device, for example comprising a GNSS sensor and/or an inertial sensor and/or a vehicle movement sensor, contributes to providing information about the expected main movement direction 4.

According to a second advantageous embodiment variant, the method can be used with a side camera 7 (cf. FIG. 4). An advantageous embodiment variant is the use of the method for automotive side cameras 7, in particular on the left side of the vehicle. In FIG. 4 it can be seen by way of example that the main direction of movement 4 runs from right to left in forward travel for cameras 7 on this side. In contrast to conventional rolling shutter sensors, in this embodiment variant, the rolling shutter is advantageously performed horizontally (instead of vertically, as usual). This allows shearing to be advantageously reduced or even avoided as much as possible for both objects in the image and for the rest of the scene (static world).

Further, the direction of the rolling shutter may be switched depending on the travel situation. For example, for single-lane roads (for example, within municipal limits or on secondary country roads), the rolling shutter may be performed from left to right so that it runs opposite to oncoming vehicles and these are thus are advantageously compressed rather than stretched. If the travel situation changes to a two-lane road (federal road, freeway, multi-lane road within municipal limits), the rolling shutter can be adapted and thus performed from right to left. This may be advantageous as the vehicles are now tending to overtake, that is, run in the opposite direction through the image.

This represents an example of the at least one image sensor 1 being part of a side camera 7 of a vehicle 5 and that the recording direction 3 can be set to be essentially the same as the direction of travel when oncoming traffic can be expected and that the recording direction 3 can be set to be essentially opposite to the direction of travel when overtaking vehicles can be expected.

Preferably, a horizontal path of the rolling shutter or a horizontal recording direction 3 for the image sensor 1 may be set. As a result, objects 12 and/or scene contents may be advantageously detected better by classifiers or neural networks. In addition, the required amount of training data may be advantageously reduced for these methods, thereby achieving advantageous cost savings.

An advantageous realization in this embodiment variant includes a determination of the main direction of movement 4 based on the installation position of cameras 6, 7, the installation of sensor 1, such that the rolling shutter can run opposite to the main direction of movement 4, as well as the dynamic switching based on the travel situation.

According to a third advantageous embodiment variant (not shown here), the method may be used in the case of a surveillance camera. An advantageous embodiment variant is the application in the case of a surveillance camera in which objects are detected and tracked. These may be vehicles or people, for example. It is also possible to use it on an assembly line, e.g., in production, or in sorting facilities.

Here, the main direction of movement can be determined either dynamically by an object tracker (image processing system), e.g., in the case of vehicles in a parking facility, or by the predetermined direction of movement by conveyor belt.

As in the previous embodiment variants, the rolling shutter can also be implemented here particularly advantageously opposite to the main direction of movement.

A particular advantage of the method may be seen in the reduction of distortions of the imaged scene, which may advantageously allow for easier detection of objects and/or scene contents. Less distortion of image contents may advantageously mean that less training data for learning computer vision methods (classifiers, neural networks) is required.

Another advantage can be seen in that the length of the scene movement between two images can be advantageously reduced, which may be particularly advantageous for calculating the optical flow.

The invention claimed is:
1. A method of operating at least one image sensor of a vehicle that records an image content with a recording direction, the method comprising:
   a) determining an expected main direction of movement of an expected movement in at least a portion of an image content to be recorded relative to the image sensor;
   b) setting the recording direction taking into account the expected main direction of movement; and
   c) recording at least a portion of the image content with the recording direction;
   wherein the expected main direction of movement is derived based on: (i) an installation position of the at least one image sensor on the vehicle, or (ii) a mounting position of the at least one image sensor on the vehicle;
   wherein the expected main direction of movement is determined based on information from a vehicle movement sensor of the vehicle.
2. The method according to claim 1, wherein the image sensor is a CMOS sensor.
3. The method according to claim 1, wherein at least one piece of information about an orientation of the image sensor is determined, and wherein the at least one piece of information about the orientation of the of the image sensor is considered in determining the expected main direction of movement.
4. The method according to claim 1, wherein the expected main direction of movement is further determined by using object tracking.
5. The method according to according to claim 1, wherein the recording direction is adapted taking into account the expected main direction of movement or a change of the expected main direction of movement.
6. The method according to claim 1, wherein the recording direction is set or adapted such that it is oriented essentially parallel to the expected main direction of movement.
7. The method according to claim 1, wherein the recording direction is set or adapted such that it is oriented essentially in the opposite direction or in the same direction as the expected main direction of movement.
8. The method according to claim 1, wherein the expected main direction of movement is determined as a function of a detected travel situation of the vehicle.
9. The method according to claim 8, wherein the detected travel situation is that the vehicle is traveling on a single-lane road.
10. The method according claim 8, wherein the detected travel situation is that the vehicle is traveling on a multi-lane road.
11. The method according to claim 1, wherein the at least one image sensor is part of a front camera of the vehicle, and wherein the recording direction is set from bottom to top when a forward travel of the vehicle is determined and the recording direction is dynamically switched as soon as the vehicle travels backwards.
12. The method according to claim 1, wherein the at least one image sensor is part of a side camera of the vehicle, and wherein the recording direction is set to be essentially the same as a direction of travel of the vehicle when oncoming traffic is expected, and wherein the recording direction is set to be essentially opposite to the direction of travel when overtaking vehicles is expected.

13. The method according to claim 1, wherein the expected main direction of movement is derived further based on at least one of the following:
   (i) at least one directional component of a movement of at least one object in an environment of the at least one image sensor;
   (ii) an optical flow; and/or
   (iii) a long-term average of movements of the at least one object.
14. An environmental sensor system of a vehicle, comprising:
   at least one image sensor, of the vehicle, that records an image content with a recording direction;
   wherein the at least one image sensor and/or the environmental sensor system are configured to perform the following:
      a) determining an expected main direction of movement of an expected movement in at least a portion of an image content to be recorded relative to the image sensor,
      b) setting the recording direction taking into account the expected main direction of movement, and
      c) recording at least a portion of the image content with the recording direction;
   wherein the expected main direction of movement is derived based: (i) an installation position of the at least one image sensor on the vehicle, or (ii) a mounting position of the at least one image sensor on the vehicle;
   wherein the expected main direction of movement is determined based on information from a vehicle movement sensor of the vehicle.
15. The environmental sensor system according to claim 14, wherein the expected main direction of movement is derived further based on at least one of the following:
   (i) at least one directional component of a movement of at least one object in an environment of the at least one image sensor;
   (ii) an optical flow; and/or
   (iii) a long-term average of movements of the at least one object.
16. A method of operating at least one image sensor of a vehicle that records an image content with a recording direction, the method comprising:
   a) determining an expected main direction of movement of an expected movement in at least a portion of an image content to be recorded relative to the image sensor;
   b) setting the recording direction taking into account the expected main direction of movement; and
   c) recording at least a portion of the image content with the recording direction; wherein the expected main direction of movement is derived based on: (i) an installation position of the at least one image sensor on the vehicle, or (ii) a mounting position of the at least one image sensor on the vehicle;
   wherein the expected main direction of movement is determined as a function of a detected travel situation of the vehicle;
   wherein the sensor is part of a side camera of the vehicle, wherein when the detected travel situation is that the vehicle is traveling on a single-lane road, the recording direction is set to a first direction, and when the detected travel situation is that the vehicle is traveling on a multi-lane road, the recording direction is set to a second direction opposite the first direction.

17. The method according to claim 16, wherein the expected main direction of movement is determined based on vehicle odometry of the vehicle.

18. The method according to claim 16, wherein the expected main direction of movement is determined based on information from a vehicle movement sensor of the vehicle.

\* \* \* \* \*